United States Patent
Luthra et al.

(10) Patent No.: US 11,356,673 B2
(45) Date of Patent: Jun. 7, 2022

(54) HTTP STREAMING APPARATUS AND SYSTEM WITH PSEUDO MANIFEST FILE AND JUST-IN-TIME ENCODING

(71) Applicant: ARRIS Enterprises LLC, Suwanee, GA (US)

(72) Inventors: Ajay Luthra, San Diego, CA (US); Praveen N. Moorthy, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 41 days.

(21) Appl. No.: 15/709,130

(22) Filed: Sep. 19, 2017

(65) Prior Publication Data

US 2018/0084256 A1     Mar. 22, 2018

Related U.S. Application Data

(60) Provisional application No. 62/396,605, filed on Sep. 19, 2016.

(51) Int. Cl.
*H04N 19/15* (2014.01)
*H04N 21/2343* (2011.01)
(Continued)

(52) U.S. Cl.
CPC ......... *H04N 19/15* (2014.11); *H04L 65/4084* (2013.01); *H04L 65/4092* (2013.01);
(Continued)

(58) Field of Classification Search
None
See application file for complete search history.

(56) References Cited

U.S. PATENT DOCUMENTS

| | | | |
|---|---|---|---|
| 9,137,551 B2 * | 9/2015 | Cote | ............... H04N 19/152 |
| 2013/0044801 A1 | 2/2013 | Cote et al. | |

(Continued)

FOREIGN PATENT DOCUMENTS

EP     2750394 A2     7/2014

OTHER PUBLICATIONS

Ke Shen, Lawrence A. Rowe, Edward J. Delp, "Parallel implementation of an MPEG-1 encoder: faster than real time," Proc. SPIE 2419, Digital Video Compression: Algorithms and Technologies 1995, (Apr. 17, 1995) (Year: 1995).*

(Continued)

*Primary Examiner* — Stuart D Bennett
(74) *Attorney, Agent, or Firm* — Chernoff, Vilhauer, McClung & Stenzel, LLP

(57) ABSTRACT

An alternative design is presented and analyzed for providing a just in time video such that even though multiple variants are advertised to a client, the bit streams need not be present. Instead, the videos are generated just in time when a client requests them. At a given time instant, only that video stream is generated which corresponds to the bit rate requested by the client and streams with other bit rates advertised in the manifest file are not generated. This saves storage cost and/or lowers the numbers of transcoders needed to generate full manifest file all the time. Two different architectures are presented and analyzed. Analysis of impacts of the encoding/transcoding speed on the behavior of such a system is presented and used in designing an optimal solution based on desired price and performance points.

6 Claims, 15 Drawing Sheets

(51) Int. Cl.

| | | |
|---|---|---|
| | *H04N 21/262* | (2011.01) |
| | *H04N 21/239* | (2011.01) |
| | *H04L 65/613* | (2022.01) |
| | *H04N 21/442* | (2011.01) |
| | *H04L 65/612* | (2022.01) |
| | *H04L 65/80* | (2022.01) |
| | *H04L 67/02* | (2022.01) |
| | *H04N 21/24* | (2011.01) |
| | *H04N 21/845* | (2011.01) |

(52) U.S. Cl.
CPC .............. *H04L 65/80* (2013.01); *H04L 67/02* (2013.01); *H04N 21/2393* (2013.01); *H04N 21/23439* (2013.01); *H04N 21/234309* (2013.01); *H04N 21/2402* (2013.01); *H04N 21/26258* (2013.01); *H04N 21/44209* (2013.01); *H04N 21/8456* (2013.01)

(56) References Cited

U.S. PATENT DOCUMENTS

2014/0040496 A1\* 2/2014 Moorthy ................ H04L 67/02
709/231
2014/0146869 A1 5/2014 Zhang

OTHER PUBLICATIONS

Telecommunication Standardization Sector of ITU H.265 High Efficiency Video Coding (HEVC) (Apr. 2015) (Year: 2015).\*
R. Pantos, W. May, "HTTP Live Streaming draft-pantos-http-live-streaming-19", IETF Trust, Web: https://datatracker.ietf.org/doc/draft-pantos-http-live-streaming/, Aug. 2017.
ISO/IEC 23009-1, "Information Technology—Dynamic Adaptive Streaming over HTTP." Second edition, May 15, 2014.
PCT International Search Report & Written Opinion, RE: Application No. PCT/US2017/052341, dated Nov. 13, 2017.

\* cited by examiner

| VARIANT (Kbps) | BWm, s = 1 | BWm, s = 2 | BWm, s = 3 | BWm, s = 4 | BWm, s = 5 | BWm, s = 6 | BWm, s = 7 | BWm, s = 8 |
|---|---|---|---|---|---|---|---|---|
| 300 | 291.26 | 566.04 | 825.69 | 1071.43 | 1304.35 | 1525.42 | 1735.54 | 1935.48 |
| 400 | 384.62 | 740.74 | 1071.43 | 1379.31 | 1666.67 | 1935.48 | 2187.50 | 2424.24 |
| 600 | 566.04 | 1071.43 | 1525.42 | 1935.48 | 2307.69 | 2647.06 | 2957.75 | 3243.24 |
| 900 | 825.69 | 1525.42 | 2125.98 | 2647.06 | 3103.45 | 3506.49 | 3865.03 | 4186.05 |
| 1200 | 1071.43 | 1935.48 | 2647.06 | 3243.24 | 3750.00 | 4186.05 | 4565.22 | 4897.96 |
| 2000 | 1666.67 | 2857.14 | 3750.00 | 4444.44 | 5000.00 | 5454.55 | 5833.33 | 6153.85 |
| 3500 | 2592.59 | 4117.65 | 5121.95 | 5833.33 | 6363.64 | 6774.19 | 7101.45 | 7368.42 |

FIG. 4

HTTP STREAMING APPARATUS AND SYSTEM WITH PSEUDO MANIFEST FILE AND JUST-IN-TIME ENCODING

CROSS REFERENCE TO RELATED APPLICATIONS

This Application claims priority under 35 U.S.C. § 119(e) from earlier filed U.S. Provisional Application Ser. No. 62/396,605, filed Sep. 19, 2016, the entirety of which is incorporated herein by reference.

BACKGROUND

Technical Field

The present disclosure relates generally to the field of HTTP streaming and more specifically to just-in-time encoding of data files in response to a received streaming request.

Related Art

In HTTP based streaming systems, e.g. HTTP Live Streaming (HLS) [1] or MPEG Dynamic Adaptive Streaming over HTTP (DASH) [2], manifest files corresponding to various bit rates and resolutions (variants) are created and advertised to the clients. A client device connects to the server over a network and downloads the segments (chunks) of the video content that are listed in the manifest file. The client device regularly measures the network bandwidth and based on that asks for the content segment having the bit rate to accommodate the network bandwidth available at that time.

To support such a design, the traditional HTTP streaming system generates or stores multiple variants of the same content at various resolutions and bit rates even though at a given time a client requests only one of them. This adds cost associated with generating and/or storing the all the variants. What is needed is an approach utilizing Pseudo Manifest file which provides an alternative to traditional HTTP streaming system, without requiring any changes on the client side, and can allow significantly lower storage and/or encoding cost in various systems.

While the concept of just-in-time processing is known in the art, significant problems exist with its use in video streaming due to latency issues. FIG. 1 depicts a graphical representation 100 of a latency issue that results in a client ultimately requesting a less-than-optimal desired delivery rate. The x-axis 102 is the chunk number being downloaded and the y-axis 104 is the bit rate. The first curve 110 shows the available bandwidth (in units of bits per sec) as measured by a client at a given time, the second curve 108 shows the bit rate requested by a client and the third curve 106 shows the bit rate served by the server. The requested bit rate is lower than the measured bandwidth by an amount that is controlled by the client based on its internal algorithm on how aggressive it is in coming close to the measured available bandwidth. In this example it is assumed that client asks for the bit rate that is 50% of measured available bandwidth if corresponding variant is advertised in the manifest file. In the beginning of this example, as shown in the FIG. 1, as the measured available bandwidth increases, the served bit rate also increases with some delay. When during chunk number 13 the measured available bandwidth decreases from 4 Mbps to 3 Mbps and the requested bit rate drops from 2 Mbps to 1.5 Mbps the client is expecting to get the bits corresponding to the advertised bit rate of 1.5 Mbps. However, as those chunks are not yet ready to be served, the server will serve chunks that are at created at 2 Mbps. This makes client lose faith in the advertised bit rates and mark 1.5 Mbps variant to be at higher (in this case, 2 Mbps) rate. As a result, when the measured bandwidth increases to 4 Mbps, the client stays with the current request of 1.5 Mbps marking that bit rate to be 2 Mbps. Thus, what is needed is a just-in-time delivery system that encodes a chuck at a desired bit rate wherein the encoding is processed at a rate faster than real-time.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of data delivery including: accessing a data file, publishing a pseudo-manifest of two or more available data bit rates, receiving a request for delivery of one of said two or more available data bit rates, encoding a first chunk of said data file in response to said request for delivery of said one of said two or more available data bit rates, and transmitting said chuck, where said encoding of said first chunk is processed at a rate greater than a real-time transcoding rate. Other embodiments of this aspect include corresponding computer systems, apparatus, and computer programs recorded on one or more computer storage devices, each configured to perform the actions of the methods.

Implementations may include one or more of the following features. The method further including: determining an encoding rate for said first chunk of said data file based at least in part on said request. The method where said encoding of said first chunk occurs at a rate at least four times a real time transcoding rate. The method further including: determining a transmission time of said encoded first chunk of said data file, and determining an encoding rate for said first chunk of said data file based at least in part on said request and said transmission time. The method where said encoding of said first chunk occurs at a rate at least four times a real-time transcoding rate. The method where said encoding of said first chunk occurs at a rate of at least eight times a real-time transcoding rate. The method further including: receiving a second request for delivery of one of said two or more available data bit rates; in response to at least said request for delivery of one of said two or more available data bit rates and said second request for delivery of one of said two or more available data bit rates, encoding a second chunk of said data file; where said encoding rate of said second chunk can be greater than, less than or the same as the encoding rate for said first chunk. The method where the encoding rate of said first chunk is at least four times a real-time transcoding rate. The method where the encoding rate of said second chunk is at least four times a real-time transcoding rate. The method where the encoding rate of said second chunk is at least four times a real-time transcoding rate. Implementations of the described techniques may include hardware, a method or process, or computer software on a computer-accessible medium.

BRIEF DESCRIPTION OF THE DRAWINGS

Further details of the present invention are explained with the help of the attached drawings in which:

FIG. 4 depicts a table showing client-side measured bandwidth based upon a network bandwidth and a transcoding speed.

DETAILED DESCRIPTION

Figure 1:
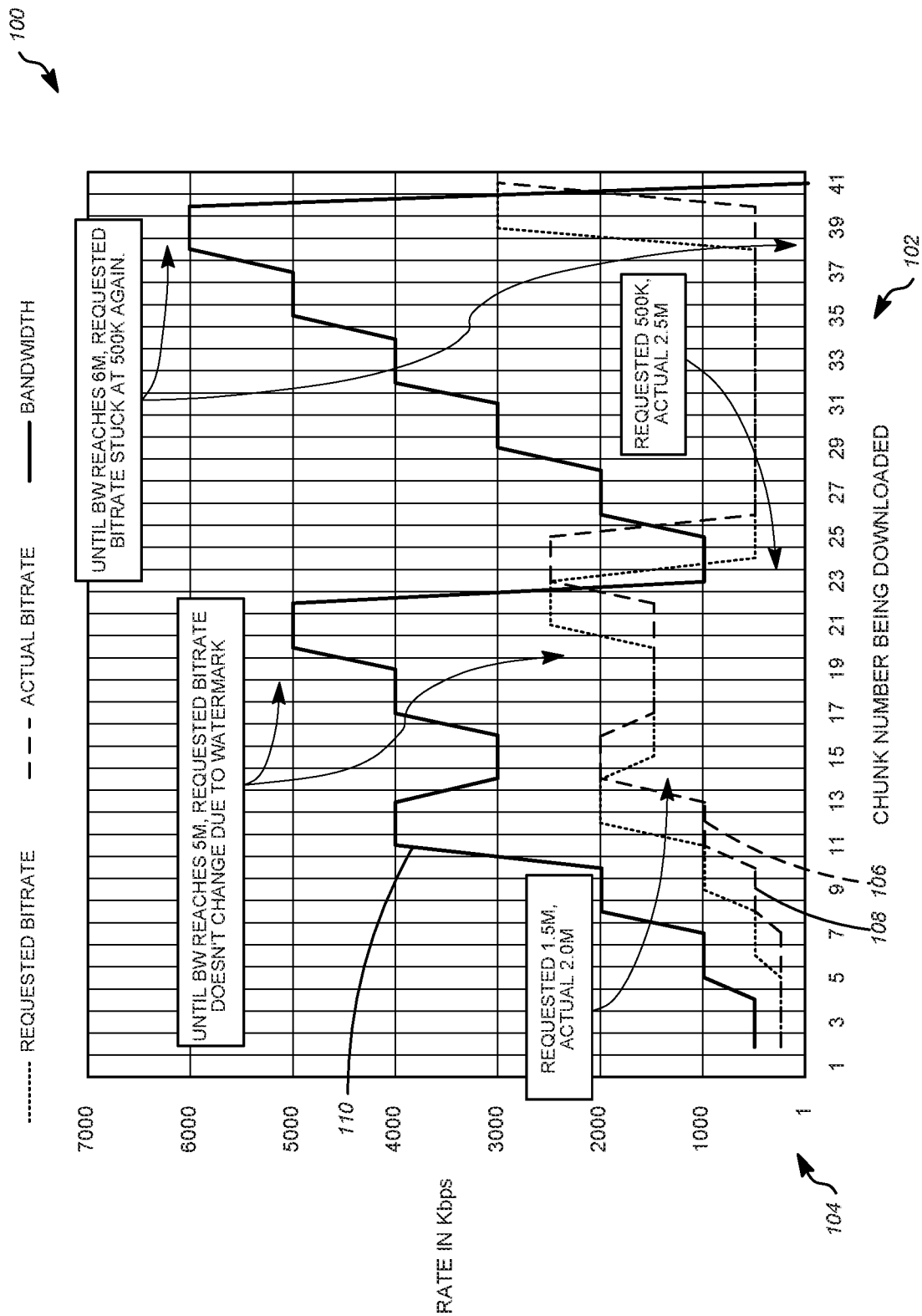
FIG. 1 depicts a graph showing deficiencies with the prior art, just-in-time data delivery systems.
Figure 2:
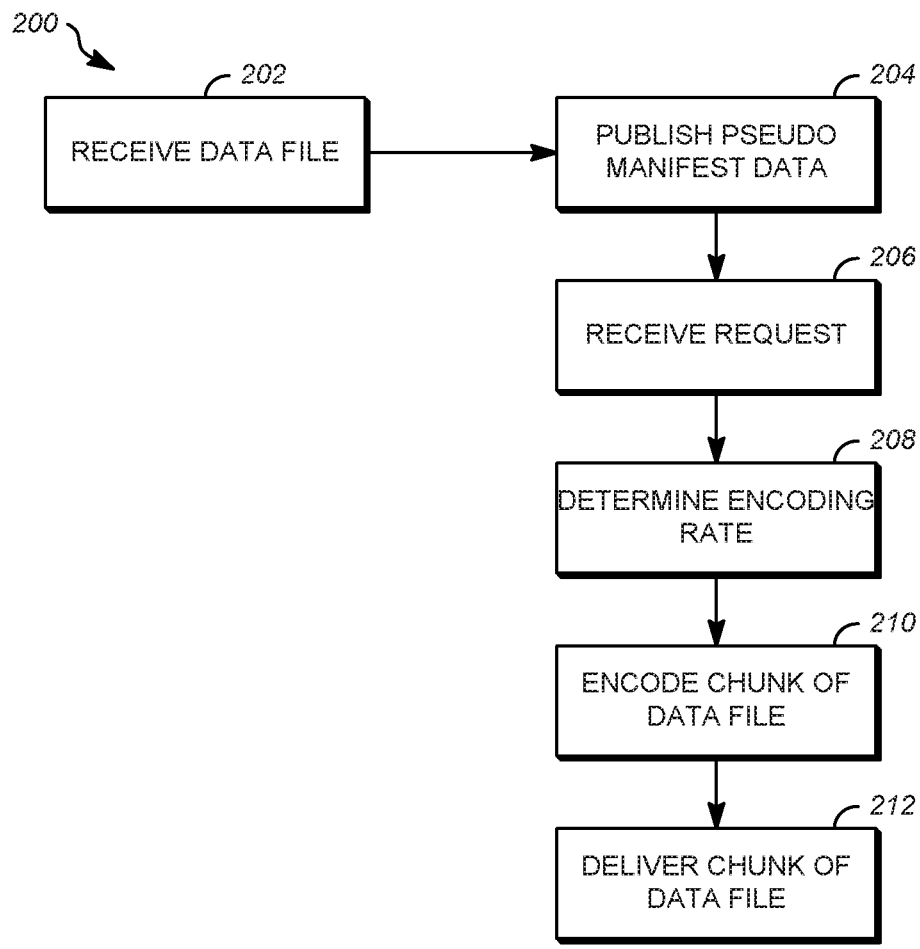
FIG. 2 depicts a system and method of just-in-time data delivery.

FIG. 2 depicts a system and method of just-in-time data delivery 200. In the embodiment depicted in FIG. 2, a data file can be received in step 202. In some embodiments, the data file can be a video file. However, in alternate embodiments the data file can be any form or type of data file. In step 204, pseudo manifest data can be generated based on desired and/or convenient data bit rates at which the data file can be encoded and delivered to client devices.

In step 206, a server can receive a request from a client device which can be related to one of the published bit rates indicated in the pseudo manifest data. Based upon a request received in step 206, a server can determine an appropriate coding rate 208 and then encode a chuck of the data file at the requested bit rate at an encoding rate faster-than-real-time encoding in step 210. The encoding rate can be performed at the rate determined in step 208, which can be higher, lower or the same as an encoding rate for a previous chunk. In some embodiments, the faster-than-real-time encoding rate can be four times a real-time encoding rate. However, in alternate embodiments, the faster-than-real-time encoding rate can be eight times a real-time encoding rate. In still further alternate embodiments, the faster-than-real-time encoding rate can be any known, convenient and/or desired encoding rate that is faster than real-time encoding. Then in step 212 the encoded chunk of the data file can be delivered to a client.

Figure 3:
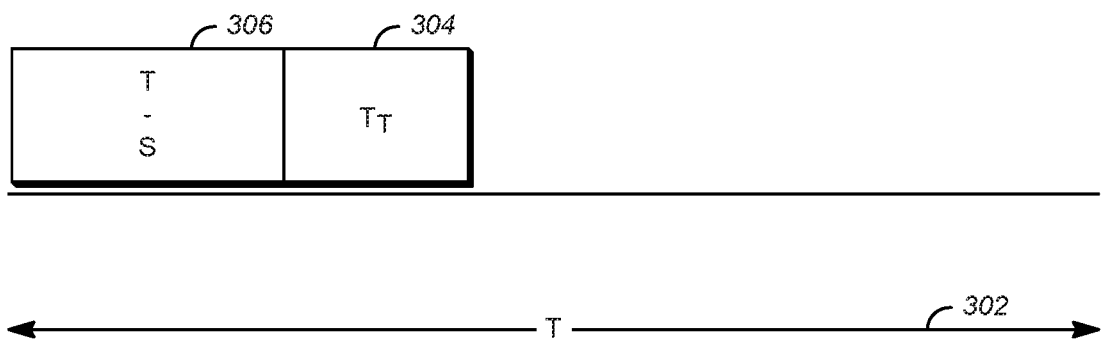
FIG. 3 depicts transcoding/encoding and transmission times in view of a chunk duration.

FIG. 3 depicts transcoding/encoding time 306 and transmission times 304 in view of a chunk duration 302. In a serial architecture case, a chunk gets created when a client requests it and the transmission starts after the creation is complete. By way of non-limiting example, this can happen when mp4 fragments are used. This can be due to the fact that fragmented mp4 files contain header information with byte range offsets that can be placed prior to the media data and this information can be generated after the entire segment has been created. Hence, in such a case, the video chunks (segments) needs to be fully generated before a packager can start its operation. In another non-limiting example, this can happen when the packager is separated from the transcoding unit and may need all the bits in the chunk before creating and advertising their availability to a client.

In the present application, let s be the faster than real time speed factor—that is, for real time transcoding/encoding s is 1, for the transcoder/encoder running at twice the speed, s is 2 and so on. Additionally, let A be the client's aggressiveness with regard to how close to the available bandwidth it requests the chunk bit rates, such that if available network bandwidth is 2 Mbps and it requests chunks at 1.4 Mbps then A is 1.4/2=0.7, and so on.

In the present application, let T be the segment duration. Accordingly, it will take the transcoder/encoder T/s secs to create the bits corresponding to a chunk of that duration. Hence, T–T/s seconds remain to transmit all the bits corresponding to that chunk. If it is assumed that $T_t$ is the time it takes to send the chunk at the available bandwidth.

For purposed of the present application, let $b_r$ be the size of a chunk in bits, $BW_a$ be the available network bandwidth in bits/sec and $BW_m$ be the bandwidth measured by a client. In some embodiments, $BW_m$ may not be the same as $BW_a$. Thus, the transfer time $T_t$ for a chunk is then given by:

$$T_t = \frac{b_r}{BW_a}$$

As $b_r$ bits are now sent in the duration of $$\frac{T}{s} + T_t$$

secs., bandwidth $BW_m$ measured by the client is given by:

$$BW_m = \frac{b_r}{\frac{T}{s} + T_t}$$

Substituting, demonstrates:

$$BW_m = \frac{b_r}{\frac{T}{s} + \frac{b_r}{BW_a}}$$

This shows that for a given transcoding speed s, $BW_m$ is a function of $BW_a$, but also of $b_r$ (the number of bits in the variant being transmitted). From this it can be noted that lower values of $b_r$ result in lower values of $BW_m$. This implies that in the case of Variable Bit Rate (VBR) encoding, if a chunk at a higher variant has very few bits, possibly due to easy to compress scene or other factors, the client will measure much lower bandwidth $BW_m$. This can cause the client to switch rates. To avoid such a client switch, the chunk can be filled with null bytes in the case the chunk size is significantly smaller than the size corresponding to the advertised bit rate.

Figure 5:
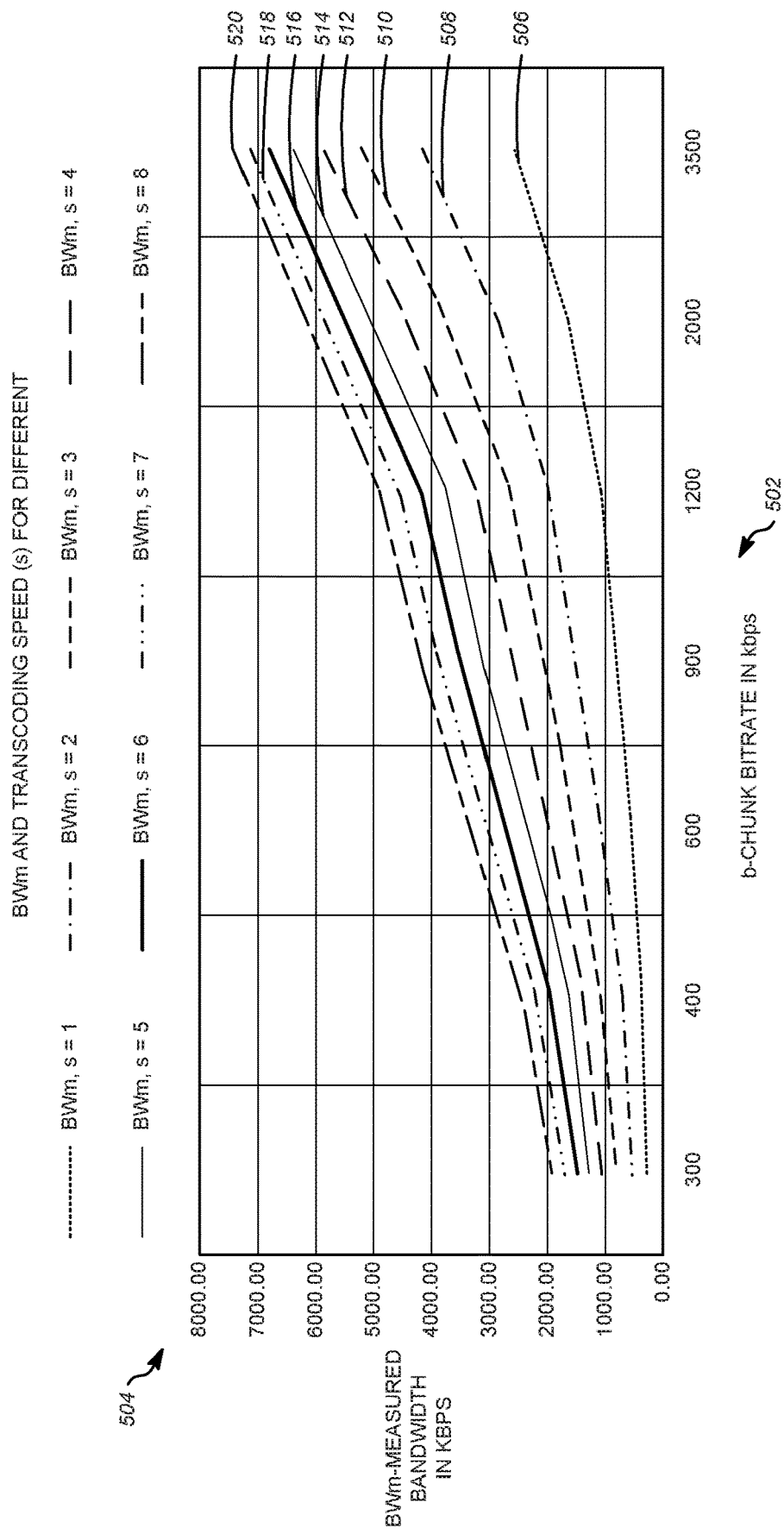
FIG. 5 depicts a graphical representation of the data provided in FIG. 4.

FIG. 4 depicts a table 400 showing client-side measured bandwidth 402 based upon a variant bitrate (bitrate of the chunk) 404 and a encoding/transcoding speed, s. FIGS. 4 and 5 demonstrate non-limiting examples of the $BW_m$ values calculated for a fixed network bandwidth of 10 Mbps and chunk duration of 2 seconds.

FIG. 4 demonstrates that the client can measure more available bandwidth for a chunk with a higher bit rate variant at a given transcoding speed. By way of non-limiting example, for the chunk at a 300 kbps variant with transcoding speed s=4, a client can measure available bandwidth to be 1.07 Mbps 406 while for the 3.5 Mbps bit rate variant with the same transcoding speed of 4× and bandwidth $BW_a$, it can measure at 5.8 Mbps 408. This behavior is due to the fact that more number of bits are being transmitted at higher bit rates in duration $T_t$. This data show that for a given variant (chunk) bit rate, increase in the transcoding speed s results in an increase in the measured bandwidth and for a given transcoding speed s, increase in variant selected by client results in an increase in bandwidth. Non-limiting, exemplary numerical results for additional simulations are shown in FIG. 4.

FIG. 5 depicts a graphical representation 500 of the data provided in FIG. 4. In the graphic representation of the data from the table 400 of FIG. 4, the x-axis 502 is the chunk rate, $b_r$ in Kbps and the y-axis represented client-side measured bandwidth, $BW_m$. Additionally, each of the lines 506 508 510 512 514 516 518 520 represent the relevant data plotted corresponding to measured bandwidth, $BW_m$, for a given encoding/transcoding speed, s, wherein the encoding/transcoding incrementally from 1-8 for each of the lines 506 508 510 512 514 516 518 520, respectively.

Based on the transfer time, $T_t$, and the measured bandwidth, $BW_m$, it can be determined that $$BW_m = \frac{T_t}{T_t + \frac{T}{s}} \times BW_a$$

and in an HLS system, the bit rate requested by a client is given by $$B_r = A \times BW_m$$

where A is the factor of aggressiveness of a client in requesting the bit rate closer to the measured bandwidth and $B_r$ is the bit rate requested by the client.

By substation it can be determined that $$B_r = \frac{T_t}{T_t + \frac{T}{s}} \times A \times BW_a$$

and that the fraction $$\frac{T_t}{T_t + \frac{T}{s}}$$

is less than 1 and represents the Pseudo Manifest Penalty. A client can then request a bit rate that is smaller by this factor than would be requested ($A \times BW_a$) in a system in which all variants were available, such as a traditional HLS system. This equation shows that as s increases the Pseudo Manifest Penalty tends to 1. Accordingly, with a greater value of s, a system utilizing a Pseudo Manifest file can more closely approximate the performance of a traditional HLS system, in which all published bitrates are generated ahead of time.

In some embodiments, a maximum spacing between advertised bit rates can be determined. At a given time of the content playback, for chunk number n, an advertised and used variant bit rate in the manifest filed can be $B_{man(n)}$ and the number of bits transferred for downloading the chunk of duration T from the manifest file can be $$b_r = T \times B_{man(n)}$$

These bits $b_r$ can be downloaded at the available bandwidth, $BW_a$, during the transfer time, $T_t$. Thus $$b_r = T_t \times BW_a$$

and resulting in $$T_t = T \times \frac{B_{man(n)}}{BW_a}$$

Also known is $$BW_m = \frac{1}{1 + \frac{T}{s \times T_t}} \times BW_a$$

which can be rewritten as $$BW_m = \frac{1}{1 + \frac{T}{s \times T \times \frac{B_{man(n)}}{BW_a}}} \times BW_a$$

and reduced to $$BW_m = \frac{1}{1 + \frac{BW_a}{s \times B_{man(n)}}} \times BW_a$$

In the state when $$\frac{BW_a}{s \times B_{man(n)}} \gg 1$$

which is typical at the initiation of a request by a client wherein the client requests a lower bit rate than the available bandwidth, the following approximation is possible $$BW_m \approx \frac{1}{\frac{BW_a}{s \times B_{man(n)}}} \times BW_a$$

or $$BW_m \approx s \times B_{man(n)}$$

Thus, even though the network may have a very large available bandwidth $BW_a$, the measured bandwidth $BW_m$ would be constrained by $$BW_m \approx s \times B_{man(n)}$$

Therefore, the bitrate $B_{man(n+1)}$ of the next variant that is advertised in the manifest file can be such that $$B_{man(n+1)} \leq A \times BW_m = A \times s \times B_{man(n)}$$

otherwise the client may not request the next higher bit rate even though network bandwidth may be available. This results in spacing between the advertised bit rates to be such that $$B_{man(n+1)} - B_{man(n)} = (A \times s - 1) \times B_{man(n)}$$

By way of non-limiting example, if A=0.5, s=4 and $BW_a$ is 10 Mbps then if the starting bit rate is 300 kbps then the next advertise bit rate must be less than 600 kbps. Otherwise, the client may not ask for higher bit rates. Furthermore, this also shows that rate at which client will increases its requested bit rate will slower than that in the traditional HLS system where the next requested bit rate in this example will be 5 Mbps ($A \times BW_a$=0.5×10 Mbps), as opposed to 600 kpbs.

For the general case where approximation is not valid, the bit rate at the next variant $B_{man(n+1)}$ should be such that $$B_{man(n+1)} \leq A \times BW_m$$

or, by substitution $$B_{man(n+1)} \approx \leq \frac{A}{1 + \frac{BW_a}{s \times B_{man(n)}}} \times BW_a$$

As such, for variants with very high bitrate ($B_{man(n)}$) or for very high values of s, such that $$\frac{BW_a}{s \times B_{man(n)}} \ll 1$$

which results in $$B_{man(n+1)} \leq A \times BW_a$$

This indicates that the next requested bit rate can be the highest allowed by the network and there is not significant penalty of using a Pseudo Manifest file for high bit rate variants and/or high transcoding speed s.

Thus, $B_r$ is a monotonically increasing function of $T_t$. Accordingly, $B_r$ is maximum when $T_t$ is maximum. The maximum chunk transfer time $T_t$ max can be the entire remainder of the chunk duration calculated as the time from the end of transcode to the end of the chunk duration. If the chunk transfer time exceeds this, the client's buffer level can drop causing underflows leading to a decision by the client to switch to a lower bitrate.

Hence, $$T_{t\,max} = T - \frac{T}{s}$$

then, by substitution, the maximum requested bit rate can be $$B_{r\,max} = A \times \frac{T - \frac{T}{s}}{T - \frac{T}{s} + \frac{T}{s}} \times BW_a$$

or $$B_{r\,max} = A \times \left(1 - \frac{1}{s}\right) \times BW_a$$

Accordingly, in the Pseudo Manifest file case, the highest possible bit rate requested by a client is reduced by a factor of (1−1/s). Hence, the encoding/transcoding speed of s=4 will result in 75% of the traditional HLS case where all the variants are available.

In some embodiments, it is possible to more tightly bound $B_r$ max. While the above material provides an upper bound for the condition when the chunk transfer time takes the entire time left over beyond the completion of the transcoding given by $$T_{t\,max} = T - \frac{T}{s}$$

However, such a condition will not always be present or satisfied. Thus, the next-higher advertised variant satisfies the condition:

$$B_{man(n+1)} - B_{man(n)} > 0$$

The next variant $B_{man(n+1)}$ will be selected if $$B_{man(n+1)} \geq A \times BW_m$$

Thus, the condition for the next higher variant to be selected by a client can be written as $$A \times BW_m - B_{man(n)} > 0$$

which by substitution can be written as $$\frac{A \times BW_a}{1 + \frac{BW_a}{s \times B_{man(n)}}} - B_{man(n)} > 0 \text{ or}$$

-continued $$A \times BW_a - B_{man(n)} - \frac{BW_a}{s} > 0 \text{ or}$$

$$\left(A - \frac{1}{s}\right) \times BW_a > B_{man(n)}$$

Accordingly, if A and s are selected such that they do not satisfy this equation, a client will not request the next variant, $B_{man(n+1)}$. Thus, the maximum bit rate requested by a client can be constrained by $$B_{rmax} = \left(A - \frac{1}{s}\right) \times BW_a$$

By way of non-limiting example, if A=0.5 and s=4 and $BW_a$=10 Mbps then the maximum requested bit rate will be less than 2.5 Mbps. Accordingly, as s increases to ∞, $B_r$ max asymptotically reaches the value of A×$BW_a$ which is the same value as in a traditional HLS system.

A review shows that as 0<A<1 and s>1, $$\left(A - \frac{A}{s}\right) > \left(A - \frac{1}{s}\right)$$

Accordingly, $$B_{rmax} = \left(A - \frac{1}{s}\right) \times BW_a$$

provides a tighter bound and this implies that $T_t$ does not reach $T_t$ max according to $$T_{tmax} = T - \frac{T}{s}$$

for $$B_{rmax} = \left(A - \frac{1}{s}\right) \times BW_a$$

Figure 6:
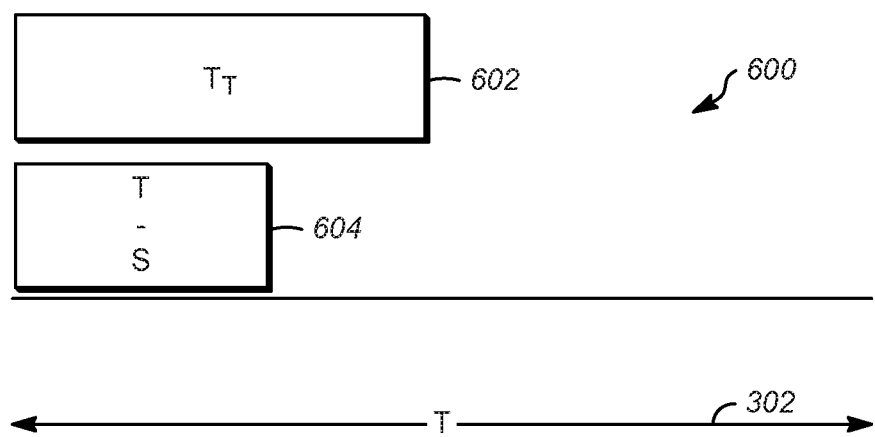
FIG. 6 depicts a graphical representation of transcoding/encoding and transmission times relative to the duration of a chuck, when operations are conducted in parallel.
Figure 7:
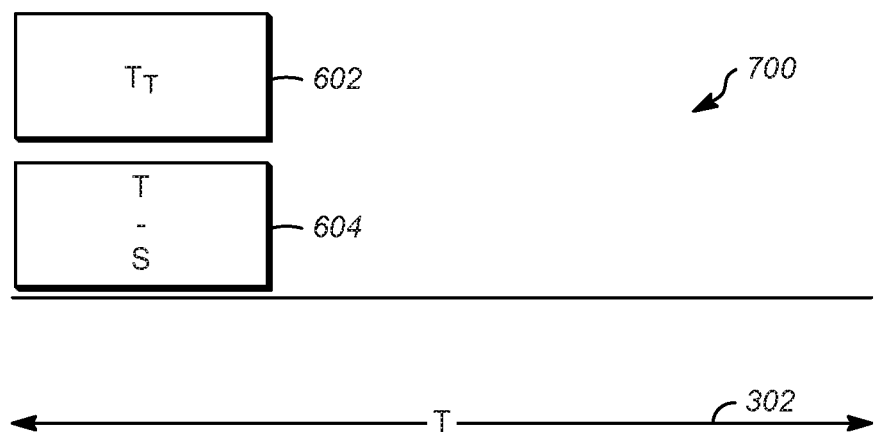
FIG. 7 depicts a graphical representation of transcoding/encoding and transmission times relative to the duration of a chuck, when operations are conducted in parallel.

In some systems, it is possible to send the bits while they are being generated by the transcoder. FIGS. 6 and 7 depict graphical representations 600 700 of transcoding/encoding times 604 and transmission times 602 relative to the duration of a chunk 302, when operations are conducted in parallel. In such a case, the transcoding time and the transmission time overlap as shown in FIGS. 6 and 7. Depending on the speed of transcoding s and the available bandwidth, two possible scenarios shown in FIGS. 6 and 7 can happen.

When bandwidth is such that $$BW_a < \frac{b_r}{\frac{T}{s}}$$

thus $$T_t = \frac{b_r}{BW_a} > \frac{T}{s}$$

That is, in this case, as shown in FIG. 6, the transmission time, $T_t$, needed to send the $b_r$ bits in a particular variant is greater than the transcoding time. Otherwise, the scenario shown in FIG. 7 applies.

In the case depicted in which $$BW_a < \frac{b_r}{\frac{T}{s}}$$

the system will behave the same as it does in the traditional HLS system when all the variants advertised in the manifest file are available ahead of time. Mathematically, in this case the bandwidth measure by a client will be $$BW_m = \frac{b_r}{T_t}$$

This is the same as in the traditional HLS system where all the variants are present or generated and available for the server to transmit as soon as a client asks for them.

In the case depicted in which $$BW_a > \frac{b_r}{\frac{T}{s}}$$

as shown in FIG. 7

$$T_t = \frac{T}{s}$$

and the measured bandwidth will be $$BW_m = \frac{b_r}{T_t} = s \times \frac{b_r}{T}$$

In such cases, the requested bit rate by the client will be $$B_r = A \times BW_m = A \times s \times \frac{b_r}{T}$$

If the bit rate of the current variant $B_{man(n)}$, that is being requested and transmitted is smaller than $B_r$, then substituting B man(n) for $b_r$/T and $B_{man(n+1)}$ for $B_r$, results in a next requested bit rate of $$B_{man(n+1)} = A \times s \times B_{man(n)}$$

In the tradition HLS system the next requested bit rate would be $$B_{man(n+1)} = A \times BW_m = A \times BW_a$$

Hence, it can be seen that in the case depicted in FIG. 7, the rate at which the requested bit rate will increase in the Pseudo Manifest file case can be less than that in the traditional HLS case until s×$B_{man(n)}$ reaches $BW_a$ and when the value crosses the $BW_a$ value, the case depicted in FIG. 6 applies.

Accordingly, the case depicted in FIG. 6 can generally be applied for conditions under which there are high advertised bit rates and the case depicted in FIG. 7 can generally be applied for conditions under which there are low advertised bit rates.

The maximum bit rate separation in situations in which there are low advertised bit rates, variants can follow:

$$B_{man(n+1)} = B_{man(n)} = (A \times s - 1) \times B_{man(n)}$$

In situations in which this relationship is satisfied, the maximum requested bit rate will approach and can eventually be the same as a traditional HLS system. However, in some embodiments, the rate at which the system will reach the traditional HLS system levels is slower than that in traditional HLS systems.

FIGS. 8-15 depict a series of experimental results for various conditions of Aggressiveness, A, and speed factor, s. In order to carry out experiments, capture and analyze the data for FIGS. 8-15, the setup consisted of the following:

A standard HLS server running on x86 Linux. Rather than use a live transcoder, pre-transcoded segments are served after adding fixed delay before the download starts. This delay is configurable and corresponds to the transcoding latency of T/s. By way of non-limiting example, for 2 second chunks, if we want to simulate a live transcoder that runs at 4× (i.e. s=4), then the fixed delay will be 2/4=500 ms. In order to remove the impact of variability of chunk sizes due to VBR in encoded chunks, we also added the ability to have all chunks in a manifest variant of the same size. By way of non-limiting example, all 2 second chunks in the 300 Kbps variant would be of size 300×1024×2=600 Kb in size.

In order to carry out tests with different values of aggressiveness, a headless HLS client was utilized. The client downloaded the chunks like a standard HLS client, but did not decode or display them. If the download finished in less than the chunk duration of T seconds then like a standard iPad client, the client waits till the end of the chunk duration before requesting more data. Additionally, the client was implemented with the following ABR Algorithm:

a. After downloading every chunk, the client measures the bandwidth.

b. If the measured bandwidth is lower than the advertised bitrate of the variant that is currently being downloaded, then the client will switch to the first variant that is just lower than A times the measured bandwidth.

c. If the measured bandwidth is higher than the advertised bitrate of the variant that is currently being downloaded, then the client will switch to the first higher rate that is just lower than A times the measured bandwidth. This switch to a higher rate will occur only if there is no buffer underflow in the client due to download of a chunk taking longer than the duration of the chunk itself. By way of non-limiting example, if the chunk has a duration of 2 seconds, it must be downloaded within 2 seconds.

Simulation Results

Using the client and HLS server, a wide variety of experiments were conducted. For these experiments, multiple manifest variants were created consisting of 79 chunks each with 2 seconds chunks and covering wide ranges of bit rates as noted below. The Linux network bandwidth limiting tool "dummynet" was used to constrain the egress bandwidth from the HLS server. The experiments consisted of capturing client manifest variant switching behavior under varying values of s and A.

Figure 8:
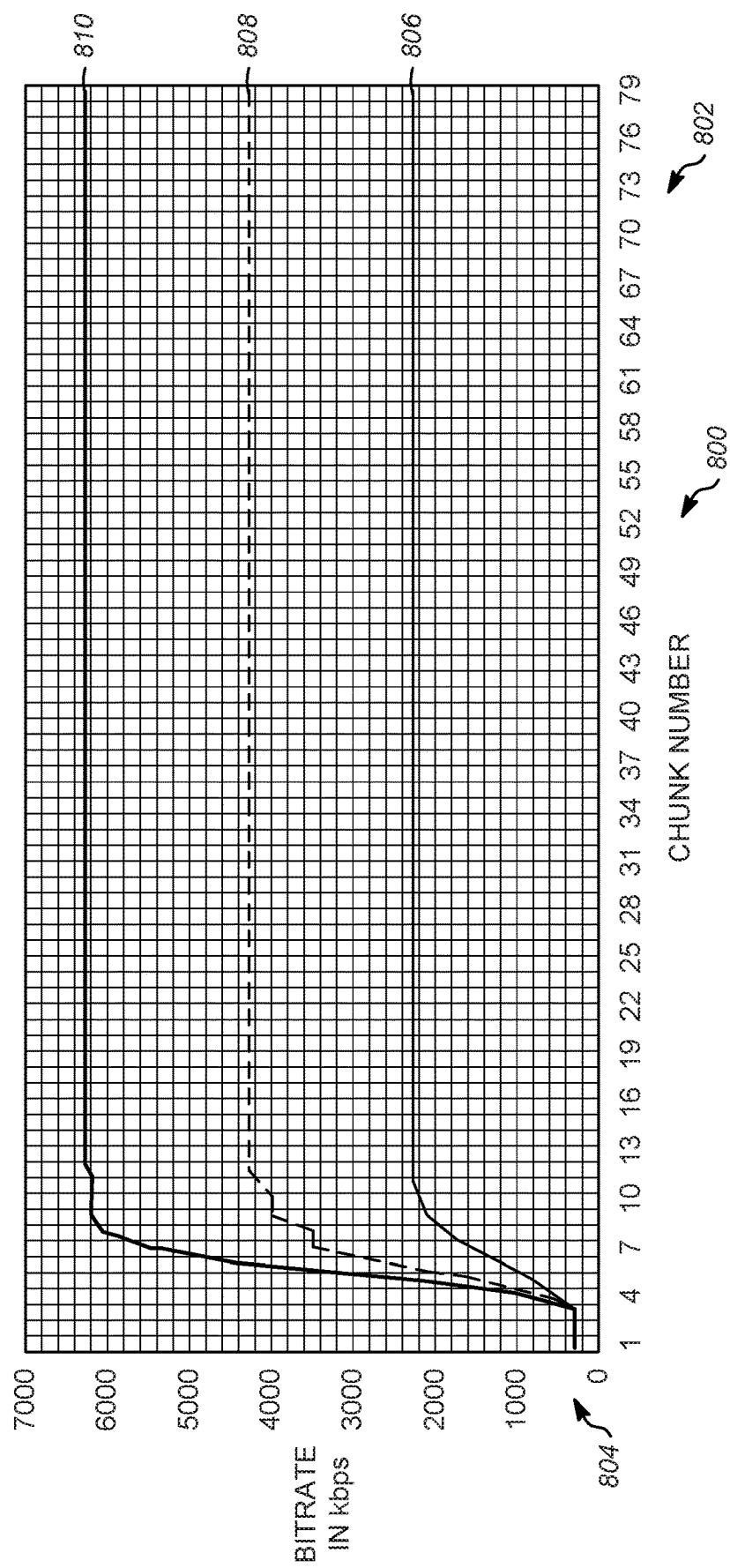
FIG. 8 depicts a graphical representation of HLS client behavior with transcoding/encoding operating at four times real-time transcoding speed and variable client aggressiveness, for serial operation.

FIG. 8 depicts a graphical representation 800 of client behavior with transcoding/encoding operating at four times real-time transcoding speed and variable client aggressiveness, for serial operation. In the embodiment depicted in FIG. 8, the x-axis 802 represents the chunk number and the y-axis 804 represents the bit rate. The lines 806, 808, 810 represented, from bottom to top, the situations in which A=0.5, 0.7 and 0.9 and s=4.

Client behavior was observed to see if there was a bound the highest manifest variant that would be requested by a client for given values of s and A for the serial operation of transcoding and transmission. FIG. 8 shows the client manifest switching pattern for the manifest file which had advertised the variants from 300 kbps to 9800 kbps in 100 kbps steps, s=4 and values of A ranged from 0.5 to 0.9.

Figure 9:
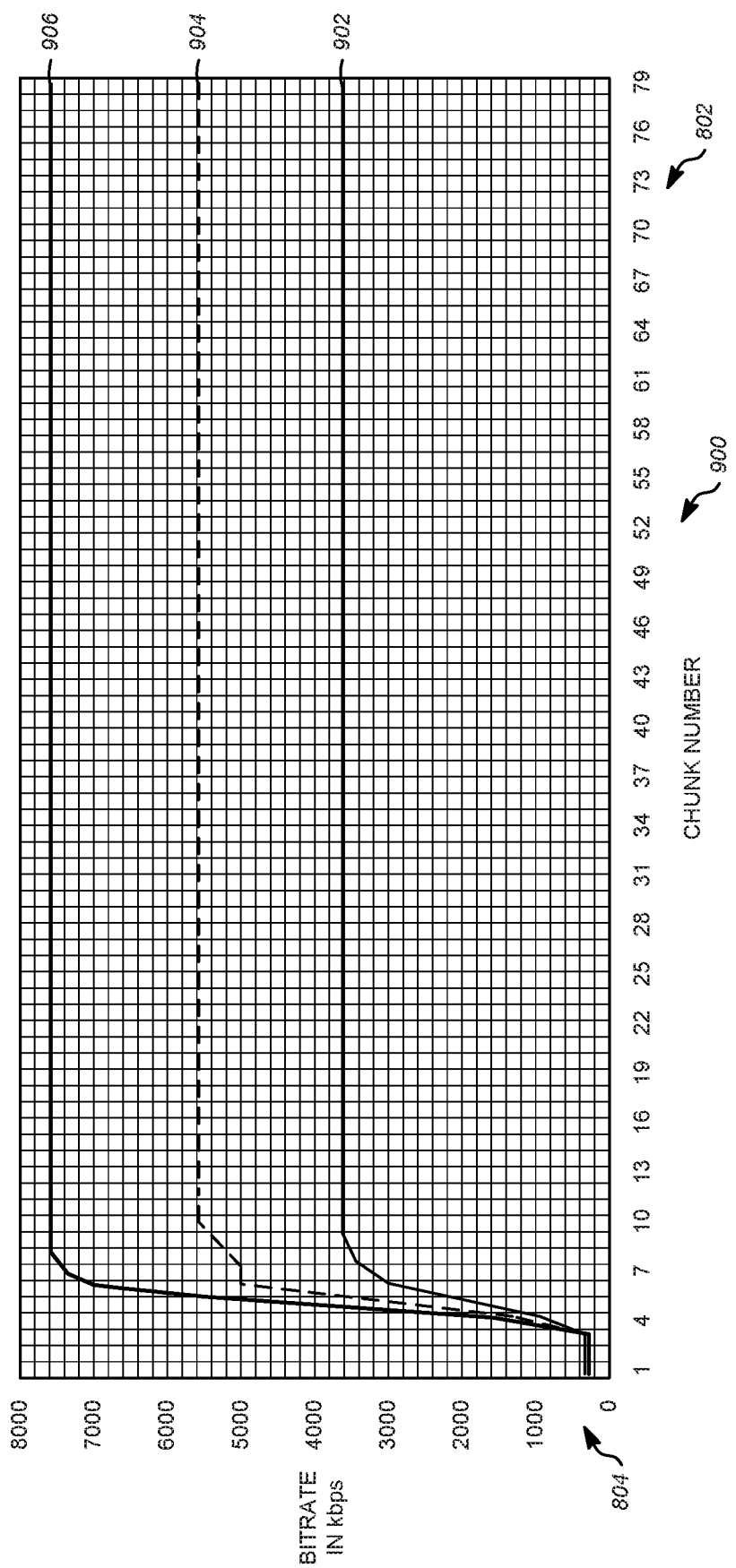
FIG. 9 depicts a graphical representation of HLS client behavior with transcoding/encoding operating at eight times real-time transcoding speed and variable client aggressiveness, for serial operation.

FIG. 9 depicts a graphical representation of HLS client behavior with transcoding/encoding operating at eight times real-time transcoding speed and variable client aggressiveness, for serial operation. In the embodiment depicted in FIG. 9, the x-axis 802 represents the chunk number and the y-axis 804 represents the bit rate. The lines 902, 904, 906 represented, from bottom to top, the situations in which A=0.5, 0.7 and 0.9 and s=8.

FIG. 9 shows a similar plot with all the settings that are same as those for FIG. 8 except the transcoder is operating at the speed of s=8.

FIGS. 8 and 9 confirm the behavior of the system as predicted by equations. They show highest bit rates $B_{r\ max}$ requested by a client is a function of A as well as the transcoding speed s. The client starts with lower bit rate and starts requesting variants with higher and higher bit rates until a plateau is reached. That plateau in the highest requested bit rate is close to the one predicted. As the aggressiveness A of the client and the transcoding speed s increase, the level of plateau also increases to the levels close to the values obtained by mathematical prediction.

Defining the penalty of using Pseudo Manifest file (with JIT-E or JIT-T) as how much lower is the requested bit rate at a given time in comparison to that in a traditional HLS system (A×$BW_a$), higher is the transcoding speed lower is the penalty. That is, the Pseudo Manifest file system's performance got closer to that of a traditional HLS case as the encoding/transcoding speed s increased. This also indicates that if the information about the encoding/transcoding speed is conveyed to the player then a more intelligent player can take that into account to calculate and measure the true available bandwidth with better accuracy requiring lower encoding speed s for the same performance.

Figure 10:
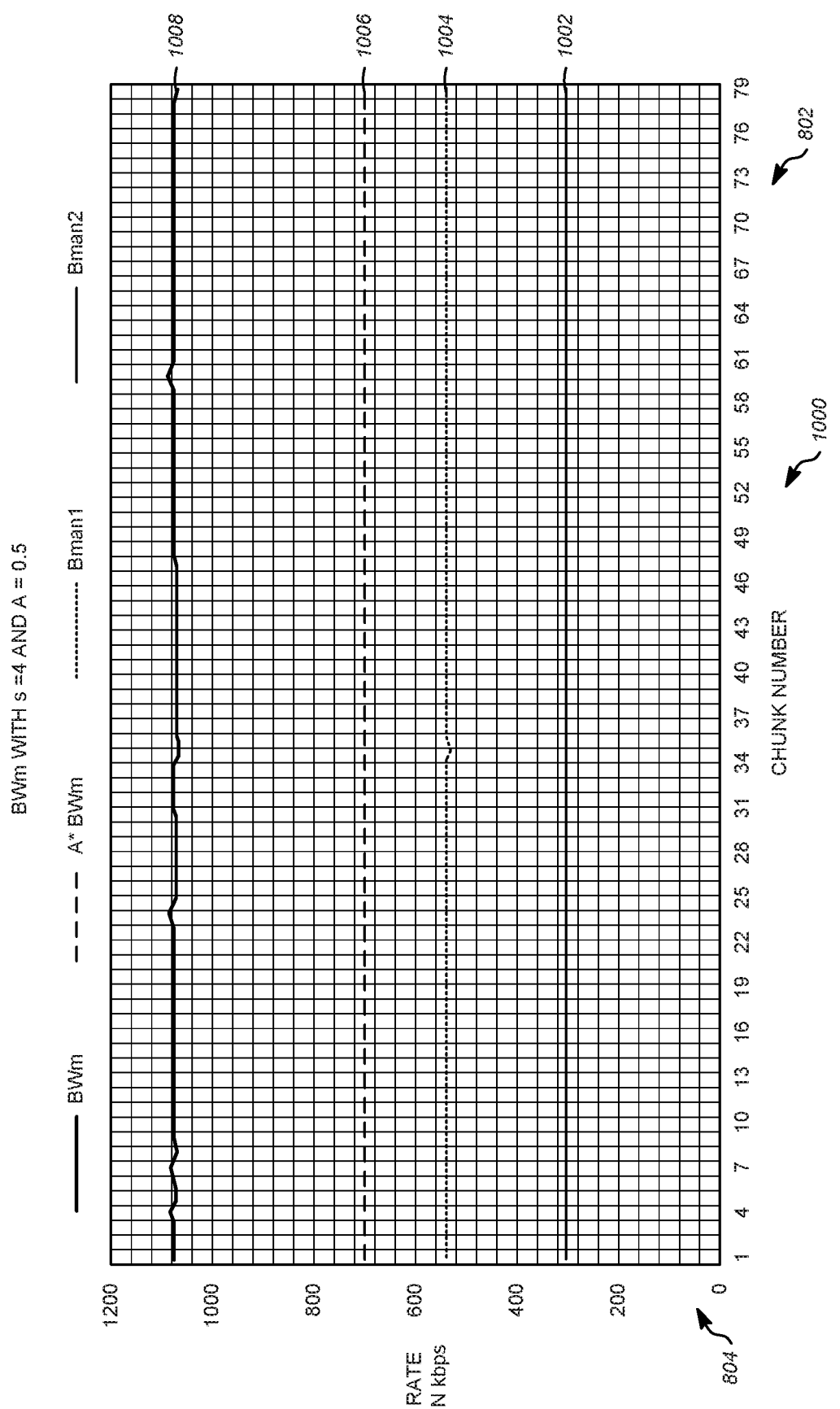
FIG. 10 depicts a graphical representation of HLS client behavior with transcoding/encoding operating at four times real-time transcoding speed and 50% client aggressiveness, for serial operation.

FIG. 10 depicts a graphical representation of HLS client behavior with transcoding/encoding operating at four times real-time transcoding speed and 50% client aggressiveness, for serial operation. In the embodiment depicted in FIG. 10, the x-axis 802 represents the chunk number and the y-axis 804 represents the bit rate and line 1002 represents $B_{man1}$, line 1004 represents A×$BW_m$, line 1006 represents $B_{man2}$ and line 1008 represents $BW_m$.

The second set of experiments included removing variants from the manifest file to investigate if the rule of maximum spacing between the bit is violated then that will cause a client to get stuck at the lower bitrate. The results are shown in FIG. 10. $B_{man1}$ represents the first variant bitrate in the manifest file and had the bit rate of 300 Kbps. $B_{man2}$ represents the next available variant and had bit rate of 700

Kbps. With a faster than real time transcoding of 4× and aggressiveness factor A of 0.5, the next variant should not be above about 600 kbps. The x-axis 802 shows the chunk number that is downloaded and the y-axis 804 shows the bit rate of that chunk. As it can be seen in FIG. 10, the client is stuck at 300 kbps and does not ask for 700 kbps. As also shown in the FIG. 10 the bandwidth measured by the client $BW_m$ is about 1070 Kbps. Therefore, for A=0.5, the client may not request the bit rate that is above around 535 Kbps. As the next variant published by the server is 700 Kbps, the client can be stuck playing back content at 300 Kbps even if the available bandwidth $BW_a$ is high as 10 Mbps.

Figure 11:
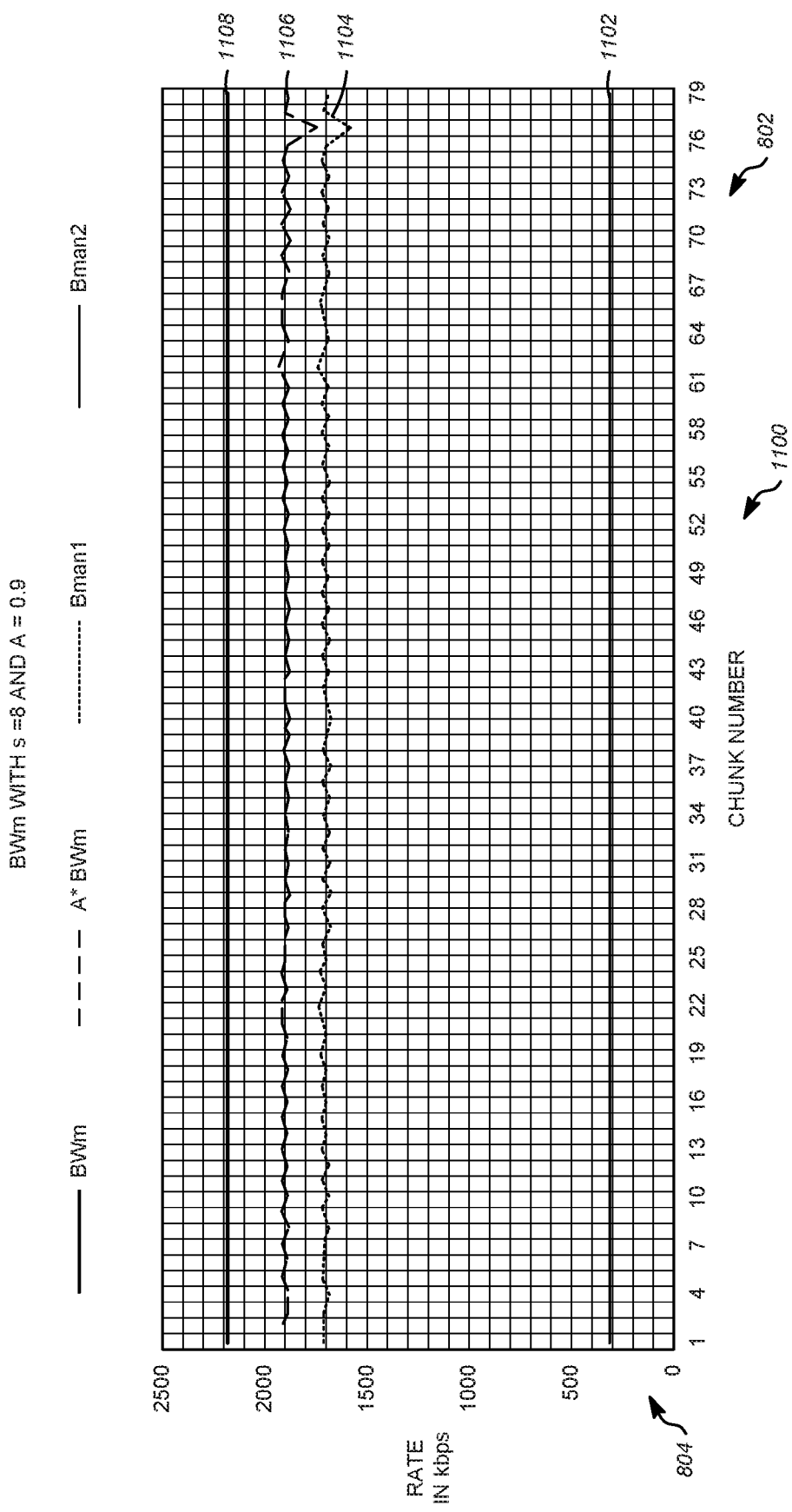
FIG. 11 depicts a graphical representation of HLS client behavior with transcoding/encoding operating at eight times real-time transcoding speed and 90% client aggressiveness, for serial operation.

FIG. 11 depicts a graphical representation of HLS client behavior with transcoding/encoding operating at eight times real-time transcoding speed and 90% client aggressiveness, for serial operation. In the embodiment depicted in FIG. 11, the x-axis 802 represents the chunk number and the y-axis 804 represents the bit rate and line 1102 represents $B_{man1}$, line 1104 represents $A \times BW_m$, line 1106 represents $BW_m$ and line 1008 represents $B_{man2}$.

Similarly, in FIG. 11, $B_{man1}$ was the first available variant of 300 Kbps and $B_{man2}$, the next published variant of 2200 Kbps. With a transcoding speed of 8×, the maximum bandwidth measured by the client BWm is about 1900 Kbps. If the aggressiveness of the client is 0.9, then the next bitrate that a client will ask for will be less than about 1710 Kbps. However, since the next available variant published by the HLS server is 2200 Kbps, the client can again be stuck at playing the 300 Kbps variant even if the available bandwidth $BW_a$ is 10 Mbps.

Figure 12:
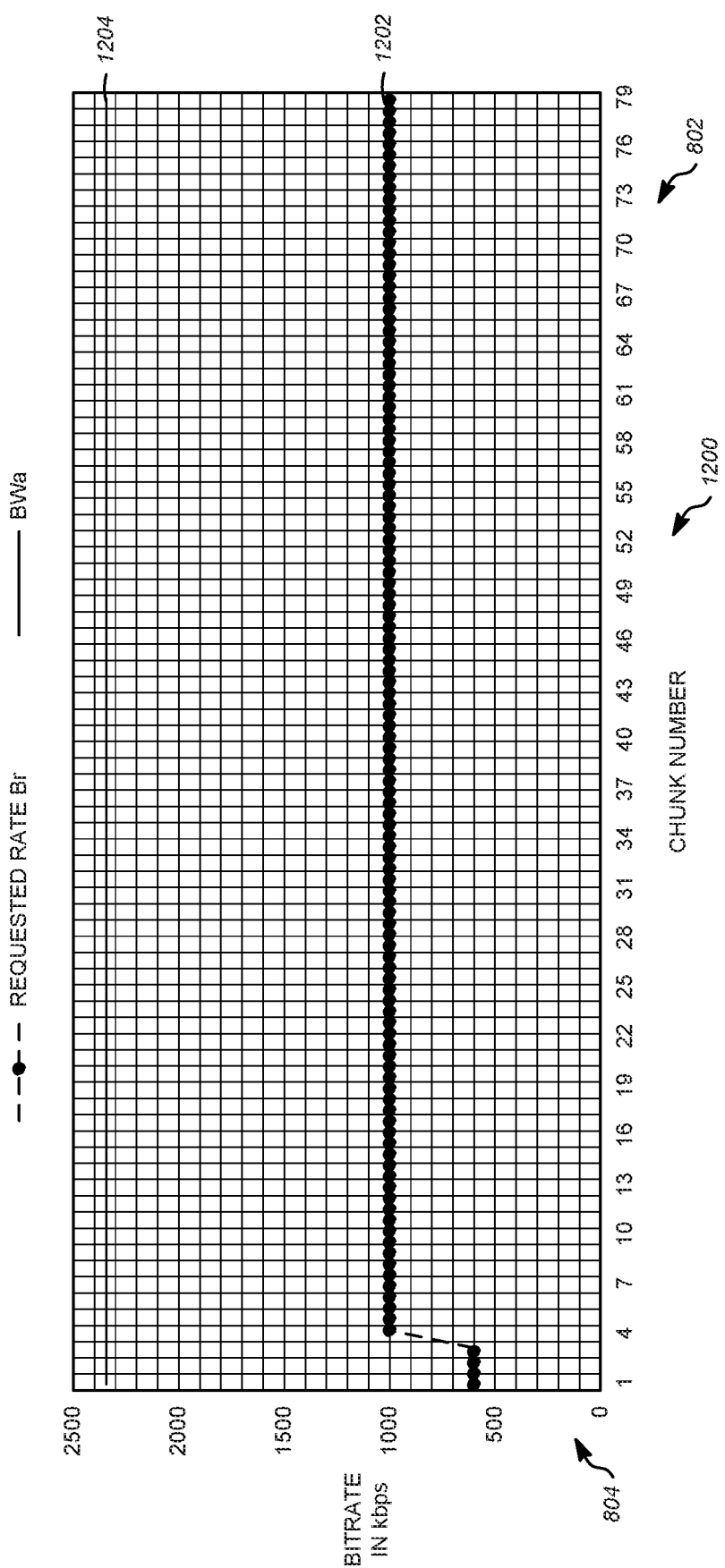
FIG. 12 depicts a graphical representation of a requested client bit rate based on a transcoding/encoding speed operating at four times real-time transcoding speed and 50% client aggressiveness, for parallel operation in a first case.

The next experiment included observing system behavior for the parallel operation of transcoding and transmission for various values of s and A. FIG. 12 shows the results obtained for one case of parallel processing. Various values of the parameters are shown on the top of the figure. As expected the requested bit rate jumped from 600 kbps to 1 Mbps and skipped 700 kbps and 800 kbps variants as the measured and available bandwidths were more than 2 Mbps.

FIG. 12 depicts a graphical representation of a requested client bit rate based on a transcoding/encoding speed operating at four times real-time transcoding speed and 50% client aggressiveness, for parallel operation in a first case. In the embodiment depicted in FIG. 12, the x-axis 802 represents the chunk number and the y-axis 804 represents the bit rate and line 1202 represents $B_r$ and line 1204 represents $BW_a$.

Figure 13:
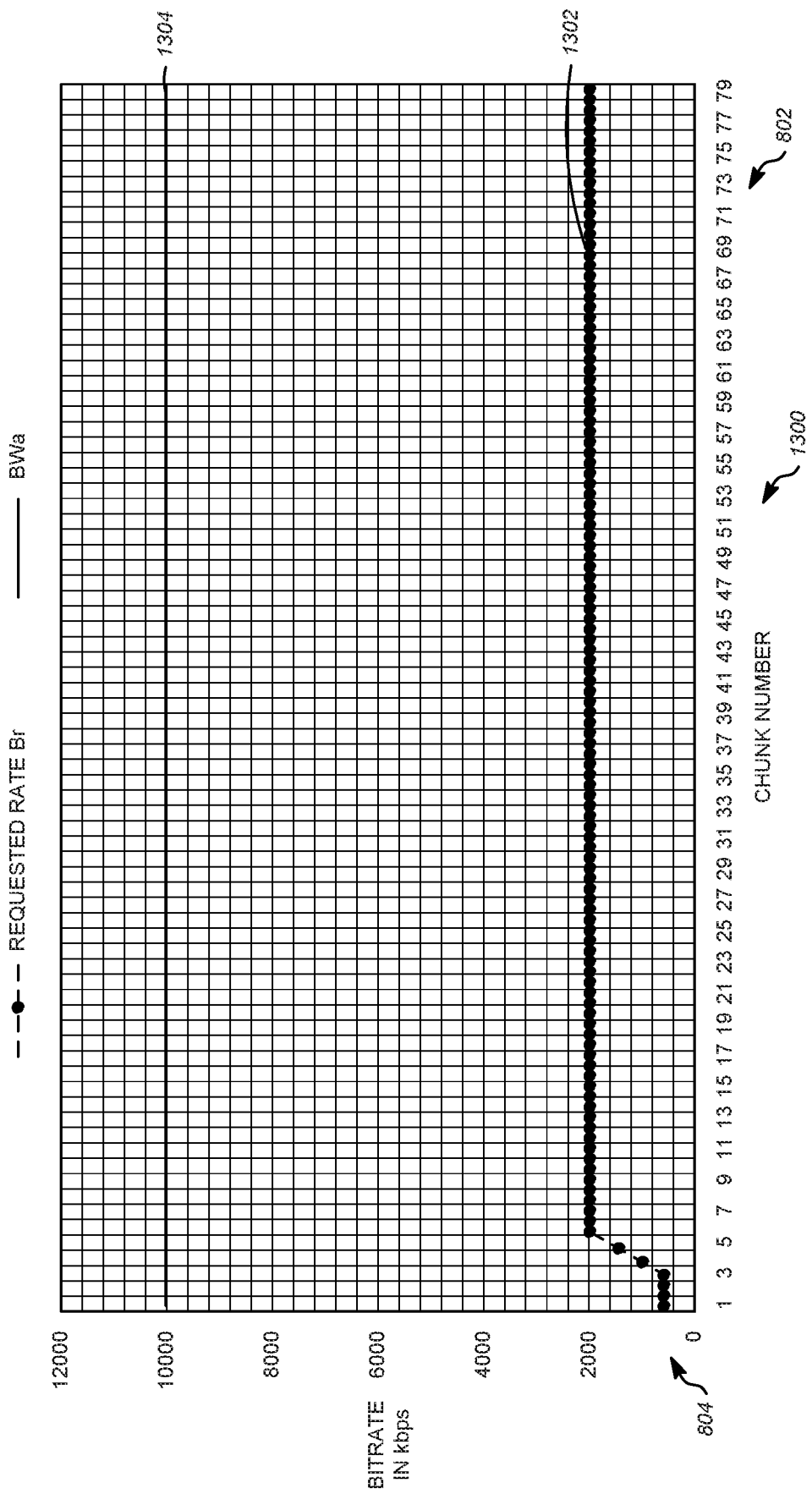
FIG. 13 depicts a graphical representation of a requested client bit rate based on a transcoding/encoding speed operating at four times real-time transcoding speed and 50% client aggressiveness, for parallel operation in a second case.

FIG. 13 depicts a graphical representation of a requested client bit rate based on a transcoding/encoding speed operating at four times real-time transcoding speed and 50% client aggressiveness, for parallel operation in a second case. In the embodiment depicted in FIG. 13, the x-axis 802 represents the chunk number and the y-axis 804 represents the bit rate and line 1302 represents $B_r$ and line 1304 represents $BW_a$.

Figure 14:
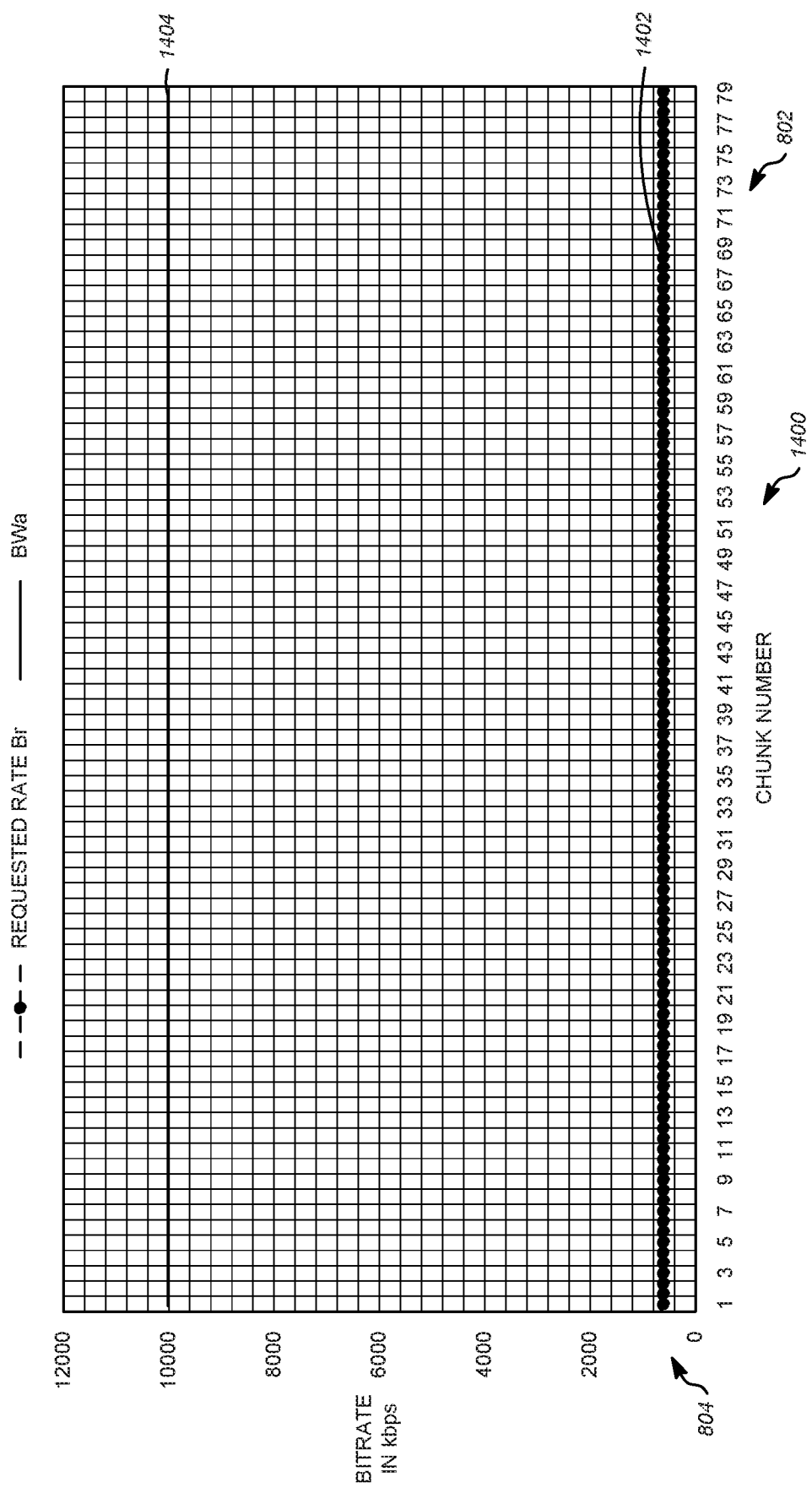
FIG. 14 depicts a graphical representation of a requested client bit rate based on a transcoding/encoding speed operating at four times real-time transcoding speed, 50% client aggressiveness and a large gap in advertised bit rate, for parallel operation in a second case.

FIG. 13 shows the results obtained for a second case of parallel processing. Various values of the parameters are shown on the top of the figure. As expected the requested bit rates now did not jump from 600 kbps straight to 2 Mbps. As predicted, it reached the value by taking intermediate jumps to 1 and 1.5 Mbps. If those intermediate variants were not present, the client may be stuck at lower bit rate. This is shown in FIG. 14, when the variant with 1 Mbps was removed in the above manifest file. The client got stuck at 600 kbps and did not request any variant at higher bit rates even though the available bandwidth was 10 Mbps.

FIG. 14 depicts a graphical representation of a requested client bit rate based on a transcoding/encoding speed operating at four times real-time transcoding speed, 50% client aggressiveness and a large gap in advertised bit rate, for parallel operation in a second case. In the embodiment depicted in FIG. 14, the x-axis 802 represents the chunk number and the y-axis 804 represents the bit rate and line 1402 represents $B_r$ and line 1404 represents $BW_a$.

Figure 15:
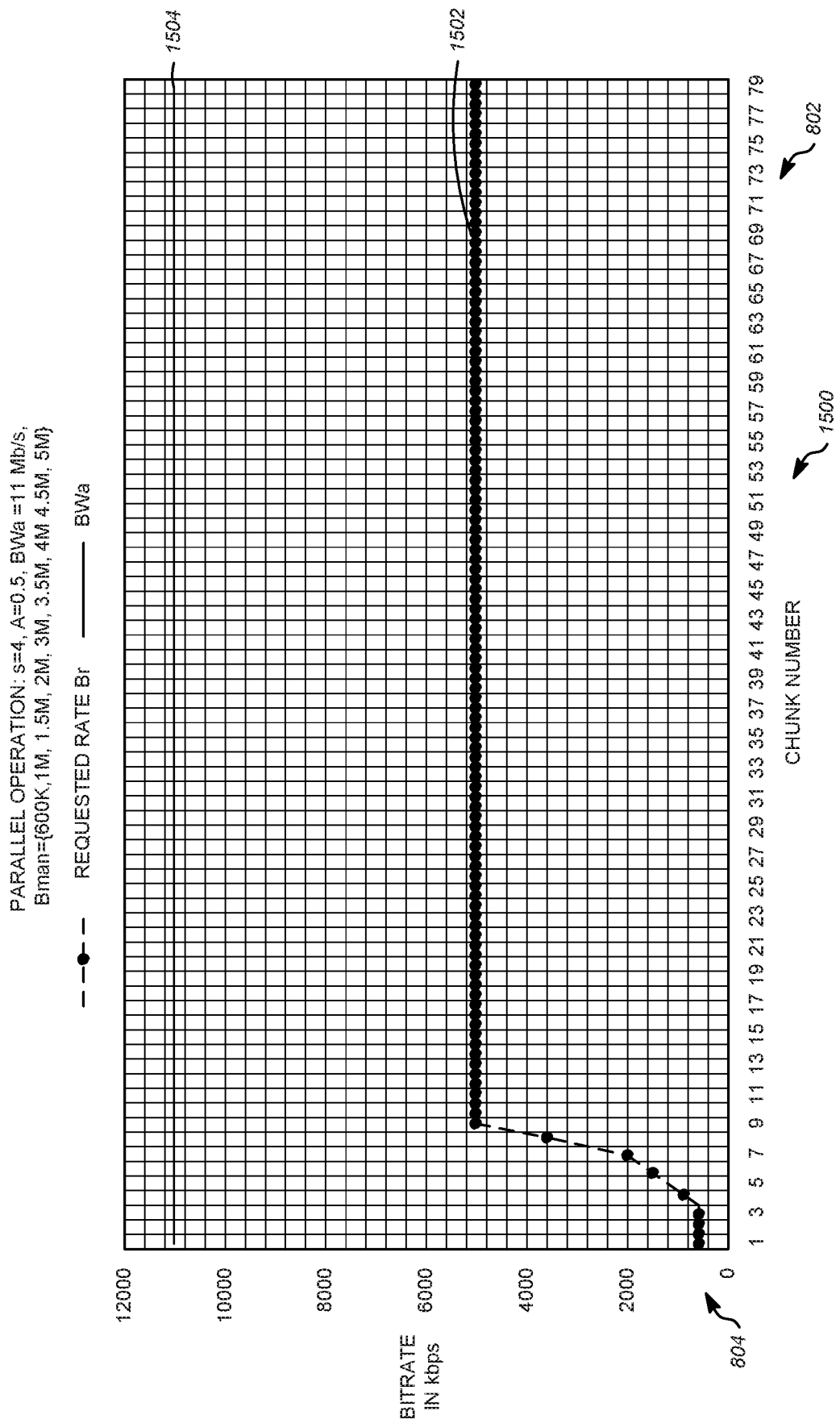
FIG. 15 depicts a graphical representation of a requested client bit rate based on a transcoding/encoding speed operating at four times real-time transcoding speed and 50% client aggressiveness, for parallel operation in a hybrid case.

FIG. 15 depicts a graphical representation of a requested client bit rate based on a transcoding/encoding speed operating at four times real-time transcoding speed and 50% client aggressiveness, for parallel operation in a hybrid case. FIG. 15 shows the results obtained for the hybrid case where a first case was valid in the beginning where the system started with lower bit rates and as the bit rates increased the behavior corresponds to a second case for parallel processing. In the embodiment depicted in FIG. 15, the x-axis 802 represents the chunk number and the y-axis 804 represents the bit rate and line 1502 represents $B_r$ and line 1504 represents $BW_a$.

A review of FIGS. 8-15 indicates that a transcoding speed of 4 or higher results in system performance that reasonably approximates the performance of traditional HLS systems.

Figure 16:
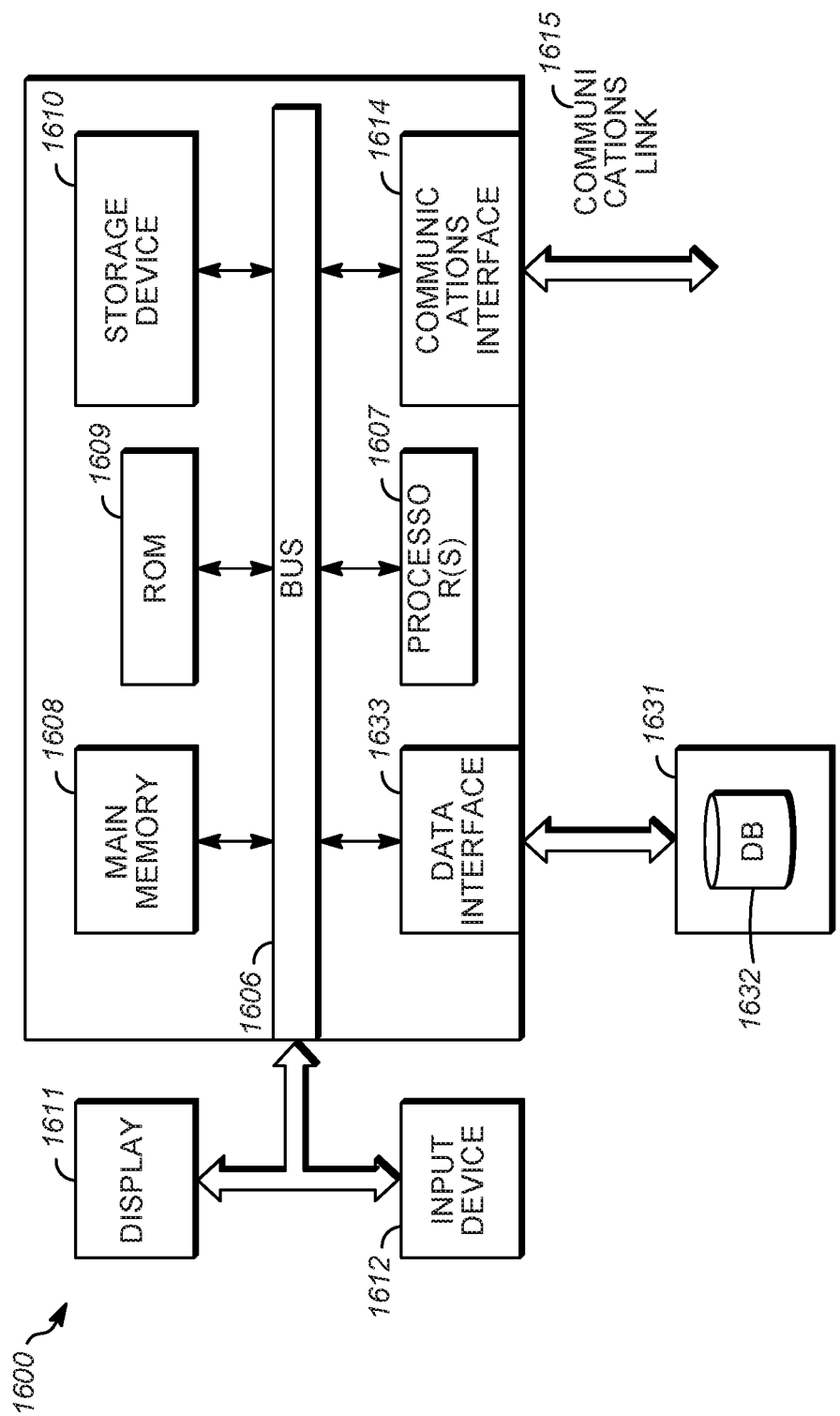
FIG. 16 depicts an embodiment of a computer system adapted and/or configured to process a method of transcoding/encoding for just-in-time data delivery.

The execution of the sequences of instructions required to practice the embodiments can be performed by a computer system 1600 as shown in FIG. 16. In an embodiment, execution of the sequences of instructions is performed by a single computer system 1600. According to other embodiments, two or more computer systems 1600 coupled by a communication link 1615 can perform the sequence of instructions in coordination with one another. Although a description of only one computer system 1600 will be presented below, however, it should be understood that any number of computer systems 1600 can be employed to practice the embodiments.

A computer system 1600 according to an embodiment will now be described with reference to FIG. 16, which is a block diagram of the functional components of a computer system 1600. As used herein, the term computer system 1600 is broadly used to describe any computing device that can store and independently run one or more programs.

Each computer system 1600 can include a communication interface 1614 coupled to the bus 1606. The communication interface 1614 provides two-way communication between computer systems 1600. The communication interface 1614 of a respective computer system 1600 transmits and receives electrical, electromagnetic or optical signals, that include data streams representing various types of signal information, e.g., instructions, messages and data. A communication link 1615 links one computer system 1600 with another computer system 1600. For example, the communication link 1615 can be a LAN, in which case the communication interface 1614 can be a LAN card, or the communication link 1615 can be a PSTN, in which case the communication interface 1614 can be an integrated services digital network (ISDN) card or a modem, or the communication link 1615 can be the Internet, in which case the communication interface 1614 can be a dial-up, cable or wireless modem.

A computer system 1600 can transmit and receive messages, data, and instructions, including program, i.e., application, code, through its respective communication link 1615 and communication interface 1614. Received program code can be executed by the respective processor(s) 1607 as it is received, and/or stored in the storage device 1610, or other associated non-volatile media, for later execution.

In an embodiment, the computer system 1600 operates in conjunction with a data storage system 1631, e.g., a data storage system 1631 that contains a database 1632 that is readily accessible by the computer system 1600. The computer system 1600 communicates with the data storage system 1631 through a data interface 1633. A data interface 1633, which is coupled to the bus 1606, transmits and receives electrical, electromagnetic or optical signals, that include data streams representing various types of signal information, e.g., instructions, messages and data. In embodiments, the functions of the data interface 1633 can be performed by the communication interface 1614.

Computer system 1600 includes a bus 1606 or other communication mechanism for communicating instructions, messages and data, collectively, information, and one or more processors 1607 coupled with the bus 1606 for processing information. Computer system 1600 also includes a main memory 1608, such as a random access memory (RAM) or other dynamic storage device, coupled to the bus 1606 for storing dynamic data and instructions to be executed by the processor(s) 1607. The main memory 1608 also can be used for storing temporary data, i.e., variables, or other intermediate information during execution of instructions by the processor(s) 1607.

The computer system 1600 can further include a read only memory (ROM) 1609 or other static storage device coupled to the bus 1606 for storing static data and instructions for the processor(s) 1607. A storage device 1610, such as a magnetic disk or optical disk, can also be provided and coupled to the bus 1606 for storing data and instructions for the processor(s) 1607.

A computer system 1600 can be coupled via the bus 1606 to a display device 1611, such as, but not limited to, a cathode ray tube (CRT) or a liquid-crystal display (LCD) monitor, for displaying information to a user. An input device 1612, e.g., alphanumeric and other keys, is coupled to the bus 1606 for communicating information and command selections to the processor(s) 1607.

According to one embodiment, an individual computer system 1600 performs specific operations by their respective processor(s) 1607 executing one or more sequences of one or more instructions contained in the main memory 1608. Such instructions can be read into the main memory 1608 from another computer-usable medium, such as the ROM 1609 or the storage device 1610. Execution of the sequences of instructions contained in the main memory 1608 causes the processor(s) 1607 to perform the processes described herein. In alternative embodiments, hard-wired circuitry can be used in place of or in combination with software instructions. Thus, embodiments are not limited to any specific combination of hardware circuitry and/or software.

The term "computer-usable medium," as used herein, refers to any medium that provides information or is usable by the processor(s) 1607. Such a medium can take many forms, including, but not limited to, non-volatile, volatile and transmission media. Non-volatile media, i.e., media that can retain information in the absence of power, includes the ROM 1609, CD ROM, magnetic tape, and magnetic discs. Volatile media, i.e., media that cannot retain information in the absence of power, includes the main memory 1608. Transmission media includes coaxial cables, copper wire and fiber optics, including the wires that comprise the bus 1606. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the embodiments have been described with reference to specific elements thereof. It will, however, be evident that various modifications and changes can be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

It should also be noted that the present invention can be implemented in a variety of computer systems. The various techniques described herein can be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language can be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system can also be considered to be implemented as a computer-readable storage medium, configured with a computer program, where the storage medium so configured causes a computer to operate in a specific and predefined manner. Further, the storage elements of the exemplary computing applications can be relational or sequential (flat file) type computing databases that are capable of storing data in various combinations and configurations.

Figure 17:
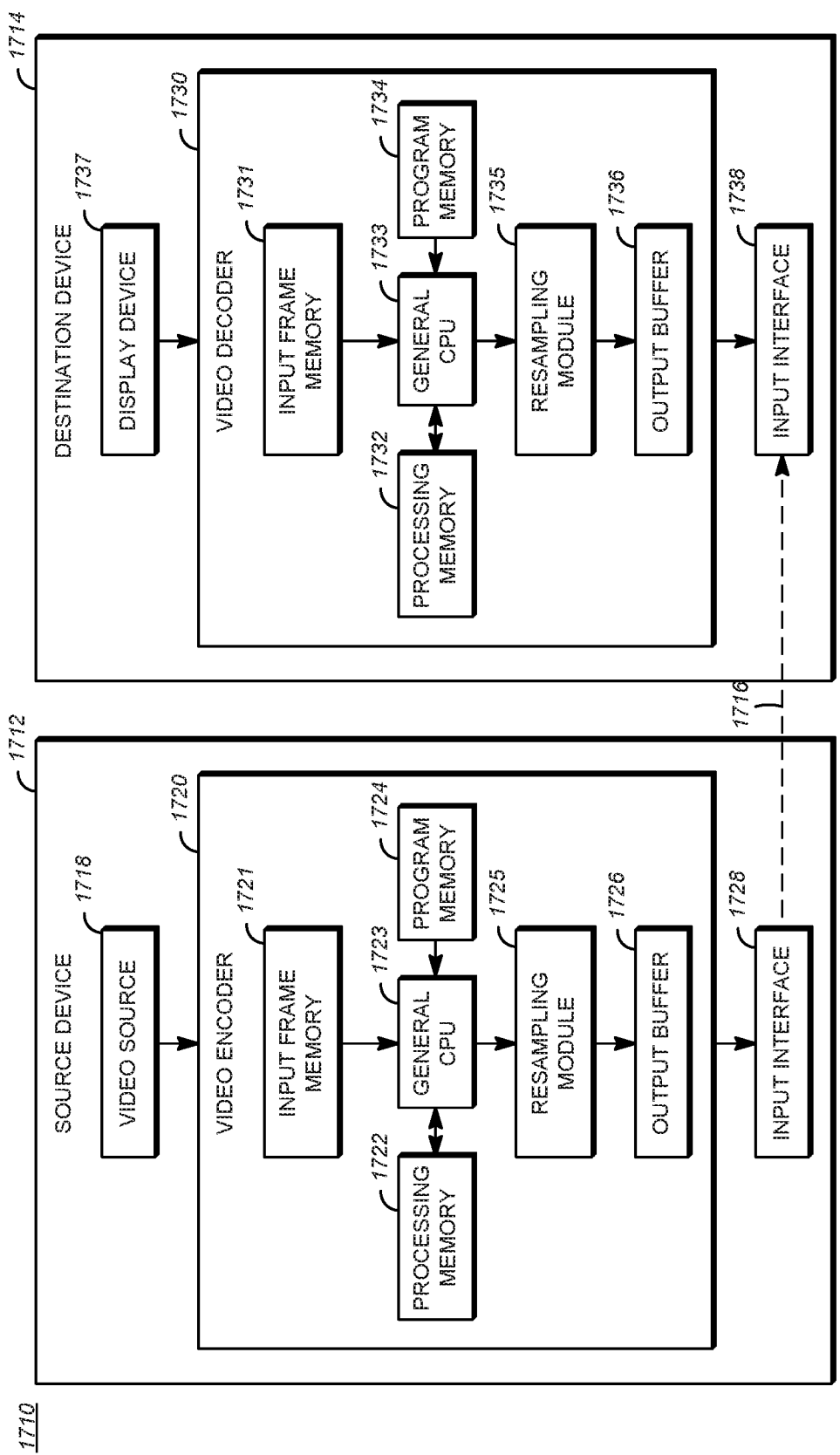
FIG. 17 depicts an embodiment of a coder/decoder system in a JVET (or any other codec standard like AVC/HEVC) encoder/decoder.

FIG. 17 is a high level view of a source device 1712 and destination device 1710 that may incorporate features of the systems and devices described herein. As shown in FIG. 17, example video coding system 1710 includes a source device 1712 and a destination device 1714 where, in this example, the source device 1712 generates encoded video data. Accordingly, source device 1712 may be referred to as a video encoding device. Destination device 1714 may decode the encoded video data generated by source device 1712. Accordingly, destination device 1714 may be referred to as a video decoding device. Source device 1712 and destination device 1714 may be examples of video coding devices.

Destination device 1714 may receive encoded video data from source device 1712 via a channel 1716. Channel 1716 may comprise a type of medium or device capable of moving the encoded video data from source device 1712 to destination device 1714. In one example, channel 1716 may comprise a communication medium that enables source device 1712 to transmit encoded video data directly to destination device 1714 in real-time.

In this example, source device 1712 may modulate the encoded video data according to a communication standard, such as a wireless communication protocol, and may transmit the modulated video data to destination device 1714. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 1712 to destination device 1714. In another example, channel 1716 may correspond to a storage medium that stores the encoded video data generated by source device 1712.

In the example of FIG. 17, source device 1712 includes a video source 1718, video encoder 1720, and an output interface 1722. In some cases, output interface 1728 may include a modulator/demodulator (modem) and/or a transmitter. In source device 1712, video source 1718 may include a source such as a video capture device, e.g., a video camera, a video archive containing previously captured video data, a video feed interface to receive video data from a video content provider, and/or a computer graphics system for generating video data, or a combination of such sources.

Video encoder 1720 may encode the captured, pre-captured, or computer-generated video data. An input image may be received by the video encoder 1720 and stored in the input frame memory 1721. The general purpose processor 1723 may load information from here and perform encoding. The program for driving the general purpose processor may be loaded from a storage device, such as the example memory modules depicted in FIG. 17. The general purpose processor may use processing memory 1722 to perform the encoding, and the output of the encoding information by the general processor may be stored in a buffer, such as output buffer 1726.

The video encoder 1720 may include a resampling module 1725 which may be configured to code (e.g., encode) video data in a scalable video coding scheme that defines at least one base layer and at least one enhancement layer. Resampling module 1725 may resample at least some video data as part of an encoding process, wherein resampling may be performed in an adaptive manner using resampling filters.

The encoded video data, e.g., a coded bit stream, may be transmitted directly to destination device 1714 via output interface 1728 of source device 1712. In the example of FIG. 17, destination device 1714 includes an input interface 1738, a video decoder 1730, and a display device 1737. In some cases, input interface 1738 may include a receiver and/or a modem. Input interface 1738 of destination device 1714 receives encoded video data over channel 1716. The encoded video data may include a variety of syntax elements generated by video encoder 1720 that represent the video data. Such syntax elements may be included with the encoded video data transmitted on a communication medium, stored on a storage medium, or stored a file server.

The encoded video data may also be stored onto a storage medium or a file server for later access by destination device 1714 for decoding and/or playback. For example, the coded bitstream may be temporarily stored in the input buffer 1731, then loaded in to the general purpose processor 1733. The program for driving the general purpose processor may be loaded from a storage device or memory. The general purpose processor may use a process memory 1732 to perform the decoding. The video decoder 1730 may also include a resampling module 1735 similar to the resampling module 1725 employed in the video encoder 1720.

FIG. 17 depicts the resampling module 1735 separately from the general purpose processor 1733, but it would be appreciated by one of skill in the art that the resampling function may be performed by a program executed by the general purpose processor, and the processing in the video decoder may be accomplished using one or more processors. The decoded image(s) may be stored in the output frame buffer 1736 and then sent out to the input interface 1738.

Display device 1737 may be integrated with or may be external to destination device 1714. In some examples, destination device 1714 may include an integrated display device and may also be configured to interface with an external display device. In other examples, destination device 1714 may be a display device. In general, display device 1737 displays the decoded video data to a user.

In some embodiments, video encoder 1720 and video decoder 1730 may operate according to other proprietary or industry standards that function with the disclosed JVET features. Thus, other standards such as the ITU-T H.264 standard, alternatively referred to as MPEG-4, Part 10, Advanced Video Coding (AVC), or extensions of such standards. Thus, while newly developed for JVET, techniques of this disclosure are not limited to any particular coding standard or technique. Other examples of video compression standards and techniques include MPEG-2, ITU-T H.263 and proprietary or open source compression formats and related formats.

Video encoder 1720 and video decoder 1730 may also, additionally or alternately operate according to a video compression standard. ITU-T VCEG (Q6/16) and ISO/IEC MPEG (JTC 1/SC 29/WG 11) are studying the potential need for standardization of future video coding technology with a compression capability that significantly exceeds that of the current High Efficiency Video Coding HEVC standard (including its current extensions and near-term extensions for screen content coding and high-dynamic-range coding). The groups are working together on this exploration activity in a joint collaboration effort known as the Joint Video Exploration Team (WET) to evaluate compression technology designs proposed by their experts in this area. A recent capture of WET development is described in the "Algorithm Description of Joint Exploration Test Model 5 (JEM 5)", WET-E1001-V2, authored by J. Chen, E. Alshina, G. Sullivan, J. Ohm, J. Boyce.

Video encoder 1720 and video decoder 1730 may be implemented in hardware, software, firmware or any combination thereof. For example, the video encoder 1720 and decoder 1730 may employ one or more processors, digital signal processors (DSPs), application specific integrated circuits (ASICs), field programmable gate arrays (FPGAs), discrete logic, or any combinations thereof. When the video encoder 1720 and decoder 1730 are implemented partially in software, a device may store instructions for the software in a suitable, non-transitory computer-readable storage medium and may execute the instructions in hardware using one or more processors to perform the techniques of this disclosure. Each of video encoder 1720 and video decoder 1730 may be included in one or more encoders or decoders, either of which may be integrated as part of a combined encoder/decoder (CODEC) in a respective device.

Aspects of the subject matter described herein may be described in the general context of computer-executable instructions, such as program modules, being executed by a computer, such as the general purpose processors 1723 and 1733 described above. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Examples of memory include random access memory (RAM), read only memory (ROM), or both. Memory may store instructions, such as source code or binary code, for performing the techniques described above. Memory may also be used for storing variables or other intermediate information during execution of instructions to be executed by a processor, such as processor 1723 and 1733.

A storage device may also store instructions, instructions, such as source code or binary code, for performing the techniques described above. A storage device may additionally store data used and manipulated by the computer processor. For example, a storage device in a video encoder 1720 or a video decoder 1730 may be a database that is accessed by computer system 1723 or 1733. Other examples of storage device include random access memory (RAM), read only memory (ROM), a hard drive, a magnetic disk, an optical disk, a CD-ROM, a DVD, a flash memory, a USB memory card, or any other medium from which a computer can read.

A memory or storage device may be an example of a non-transitory computer-readable storage medium for use by or in connection with the video encoder and/or decoder. The non-transitory computer-readable storage medium contains instructions for controlling a computer system to be configured to perform functions described by particular embodiments. The instructions, when executed by one or more computer processors, may be configured to perform that which is described in particular embodiments.

Also, it is noted that some embodiments have been described as a process which can be depicted as a flow diagram or block diagram. Although each may describe the operations as a sequential process, many of the operations can be performed in parallel or concurrently. In addition, the order of the operations may be rearranged. A process may have additional steps not included in the figures.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Although exemplary embodiments of the invention have been described in detail and in language specific to structural features and/or methodological acts above, it is to be understood that those skilled in the art will readily appreciate that many additional modifications are possible in the exemplary embodiments without materially departing from the novel teachings and advantages of the invention. Moreover, it is to be understood that the subject matter defined in the appended claims is not necessarily limited to the specific features or acts described above. Accordingly, these and all such modifications are intended to be included within the scope of this invention construed in breadth and scope in accordance with the appended claims.

What is claimed:

1. A method of data delivery comprising:
   accessing a data file;
   publishing a pseudo-manifest of two or more available playback bit rates for said data file;
   receiving a request for delivery of said data file at a selected bit rate, selection from said two or more available playback bit rates;
   encoding a first chunk of said data file at the selected bit rate to be delivered first in time relative to remaining subsequent chunks of the data file that are delivered at the selected bit rate later in time in response to said request for delivery of said data file; and
   transmitting said first chunk,
   wherein said encoding of said first chunk is encoded at the selected bit rate at a processing rate greater than a real-time transcoding rate, while the subsequent chunks are encoded at the selected bit rate at a processing rate lower than the first chunk.

2. The method of claim 1 further comprising:
   determining an encoding rate for said first chunk of said data file based at least in part on said request.

3. The method of claim 2 wherein said encoding of said first chunk occurs at a rate at least four times a real-time transcoding rate.

4. The method of claim 1 further comprising:
   determining a transmission time of said encoded first chunk of said data file; and
   determining an encoding rate for said first chunk of said data file based at least in part on said request and said transmission time.

5. The method of claim 1 wherein said encoding of said first chunk occurs at a rate at least four times a real-time transcoding rate.

6. The method of claim 5 wherein said encoding of said first chunk occurs at a rate of at least eight times a real-time transcoding rate.

\* \* \* \* \*